Patented Oct. 9, 1928.

1,687,433

UNITED STATES PATENT OFFICE.

JULIUS DRUCKER, OF COLOGNE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

PURIFYING BRINE TO BE USED IN ELECTROLYTIC PROCESSES.

No Drawing. Application filed August 17, 1927, Serial No. 213,693, and in Germany September 29, 1926.

The present invention relates to a process of purifying brine to be used in electrolytic cells.

It is known that the brine to be used in electrolytic processes must possess a high degree of purity in order to avoid any disturbance of the operation. In particular the presence of magnesium and calcium salts even in small amounts exerts a disturbing effect in the continuous working of an amalgam cell, since in consequence of the circulation of the brine between the cell and the saturation device the mercury is enriched in magnesium and calcium in the form of amalgams, thereby giving rise to evolution of hydrogen and endangering the normal working of the cell by the pollution of the mercury. The customary methods for the purification of brine by precipitation with sodium carbonate, sodium oxalate or sodium phosphate involve a considerable expenditure of the precipitating agents, since the brine during the working stage is saturated with chlorine and shows an acid reaction.

Now I have found that by saturating the brine with an alkali metal fluoride especially with sodium fluoride, magnesium and calcium salts are precipitated quantitatively, the acid reaction as well as the chlorine content of the brine not influencing the completeness of the precipitation in any way. The small amounts of sodium fluoride which enter into solution, about 1 per mille, do not prejudice the working of the cell.

The process can be worked as in continuous operation.

The following example will illustrate my invention:

1.5 kg. of sodium fluoride are stirred into 1,000 kg. of brine, saturated with chlorine and containing 33% of sodium chloride, 80 mg. of magnesium chloride and 180 mg. of calcium chloride per litre; the precipitate is allowed to settle and is filtered. In the filtrate the $MgCl_2$-content has fallen to below 10 mg. of $Mg(OH)_2$ per litre, and the $CaCl_2$-content to below 12 mg. of $Ca(OH)_2$ per litre.

Having now particularly described and ascertained the nature of my said invention and in what manner the same is to be performed, I declare that what I claim is:

1. The process of purifying brine to be used in electrolytic processes from magnesium and calcium salts which consists in saturating the brine with an alkali metal fluoride, and separating the precipitated magnesium and calcium fluorides.

2. The process of purifying brine to be used in electrolytic processes from magnesium and calcium salts which consists in saturating the brine with sodium fluoride and separating the precipitated magnesium and calcium fluorides.

In testimony whereof I have hereunto set my hand.

JULIUS DRUCKER.